United States Patent
Babchin et al.

(10) Patent No.: US 6,783,633 B2
(45) Date of Patent: Aug. 31, 2004

(54) DIELECTRIC BREAKDOWN CHEMICAL REACTOR FOR LIQUIDS

(75) Inventors: Alexander Joseph Babchin, Edmonton (CA); Jian-Yang Yuan, Edmonton (CA); Ezra Eddy Isaacs, Edmonton (CA); Haibo Huang, Edmonton (CA); Ross Sam Chow, Sherwood Park (CA); Richard Anthony McFarlane, Edmonton (CA); Dmytro Vassily Prudkyy, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 471 days.

(21) Appl. No.: 09/929,092

(22) Filed: Aug. 15, 2001

(65) Prior Publication Data

US 2002/0029970 A1 Mar. 14, 2002

Related U.S. Application Data (63) Continuation-in-part of application No. PCT/CA00/00140, filed on Feb. 15, 2000.

(30) Foreign Application Priority Data

Feb. 16, 1999 (CA) .............................................. 2262033

(51) Int. Cl.[7] ................................................. B01J 19/08
(52) U.S. Cl. ..................................... 204/164; 204/165
(58) Field of Search ............................. 204/164, 165, 204/172

(56) References Cited

U.S. PATENT DOCUMENTS

| | | | | |
|---|---|---|---|---|
| 4,077,870 A | * | 3/1978 | Horowitz | 208/128 |
| 5,458,752 A | | 10/1995 | Lizama et al. | |
| 5,824,203 A | | 10/1998 | Remo | |
| 5,904,816 A | * | 5/1999 | Berger | 204/157.15 |
| 6,267,933 B1 | * | 7/2001 | Thomason | 422/186.04 |
| 6,638,475 B1 | * | 10/2003 | Lagunas-Solar et al. | 422/22 |

FOREIGN PATENT DOCUMENTS

GB          1 208 163 A      10/1970

* cited by examiner

Primary Examiner—Kishor Mayekar
(74) Attorney, Agent, or Firm—Freedman & Associates (57) ABSTRACT

This invention relates to the enhancement of chemical reactions by applying a high frequency electric field to a material. The frequency and amplitude of the electric field are selected in accordance with the properties of the reacting components in the bulk of chemical reactor. In general, the high frequency range is determined by the dielectric properties of reactant(s), that is, at any given temperature, when, for example, the specific conductivity starts to grow from its low frequency value. Typically, frequencies in the range of 100 kHz to 200 MHz or greater are suitable for the enhancement of the reactions. An electric field of any shape having Fourier components that when applied to a chemical process exhibits growth in the real part of conductivity relative to the low frequency value is of particular importance.

31 Claims, 4 Drawing Sheets

DIELECTRIC BREAKDOWN CHEMICAL REACTOR FOR LIQUIDS

This application is a continuation-in-part of PCT International Application PCT/CA00/00140 filed Feb. 15, 2000 which claims priority from Canadian Patent Application No. 2,262,033 filed Feb. 16, 1999.

FIELD OF THE INVENTION

This invention relates to the application of high frequency electric fields for the control of chemical processes.

BACKGROUND OF THE INVENTION

In general, chemical processes are affected when appropriate local environmental conditions are modified. For example, the rate of the reaction may increase, the selectivity may increase, and/or reactions that would otherwise have low yield or be prohibitively expensive might thus become commercially feasible.

Catalysts and enzymes substantially increase the rate of a reaction even if present in small concentrations. The mechanism for this enhancement is usually expressed in terms of reducing the activation energy of the reaction. Of course, not all chemical reactions are so enhanced and still other reactions are enhanced often only under a limited set of conditions.

Often, increasing the temperature or pressure enhances reactions. The mechanism for this enhancement is usually expressed in terms of increasing the likelihood of overcoming the activation energy. However, this type of an enhancement often has undesirable aspects.

Externally applied electric fields are known to affect physical processes in electrorheological fluids, such as slurries, and are used in electrophoresis and field-flow fractionation to separate phases. Further, reaction rates of many chemical processes are affected by the application of an electric field, as in Friedel-Crafts, decomposition, proton-transfer reactions, and field-induced effects at surfaces.

However, these applications all involve high electric field strengths of at least 1000 V/cm or even as high as several V/Å. In general, it is undesirable to use high voltage DC electric fields because they cause unwanted ionization, such as hydrolysis, or other unwanted reactions to occur.

In electrolysis, electron transfer is a critical reaction step. Electrons are provided or removed at appropriate electrodes. Conventional electrolysis is typically carried out in media with high ionic strength, usually provided by electrolytic solutions or molten salts and with low applied voltages, typically less than 2 volts. The concentration of ions and salts might be higher than that of reactants, thereby limiting desired reaction paths or providing additional unwanted reaction paths. Furthermore, the limited voltage window in electrolysis due to the high ion and salt concentration often blocks desired reaction paths that correspond with larger voltage fields. As such, certain reactions are unreachable with conventional electrolysis.

In dispersion electrolysis, metal spheres or supported-metal particles are suspended in a high-impedance medium between feeder electrodes. Due to the small size of the metal spheres and supported metal clusters, the unique properties of microelectrodes apply—electrolysis of small amounts of material in the absence of supporting electrolyte salt. However, the suspension provides for a large number of particles so that the resulting macroscopic electrode area is large; this makes it possible to electrolyze relatively large quantities of material at the ensemble of microelectrodes. Since dispersion electrolysis is a form of electrolysis, electron transfer is a critical reaction step.

U.S. Pat. Nos. 5,296,106 and 5,397,447 in the name of Rolison et al. disclose a system and method for enhancing chemical reactions using a constant DC field to assist in chemical reactions. Specifically, a reactant is brought in contact with a stable, non-soluble, porous, and electronically non-conductive solid (reaction enhancer) in a fluidic medium to form a reaction mixture of low ionic strength. The reaction mixture so formed is then subjected to an electrifying force thereby enhancing the chemical reaction.

In U.S. Pat. No. 5,137,607 issued Aug. 11, 1992 to Anderson et al. variable DC voltage is suggested to vary voltage and polarity over time, to change the Fermi level of the membrane relative to the electrode to create a favorite condition for a certain reaction or reaction direction to occur. However it is understood that very low frequency varying voltage of less then one Hz is required for this to occur.

GB Patent Number 1,208,163 discloses a method and apparatus for the manufacture of phenols. A gaseous mixture of an aromatic hydrocarbon and an oxygen containing gas is introduced into a reaction chamber wherein the gaseous mixture is subjected to a silent electric discharge having a carrying frequency in the range of 30 Hz to 2 MHz and a field strength of 20–150 kV/cm. Of course, the field strength that is required to induce silent discharge in a gas is approximately invariant as a function of the carrying frequency. That said, one of skill in the art would not use high frequency electric fields, such as for instance up to 100 GHz, because high frequency and high power is hazardous.

Moreover, as is well known in the power industry, low frequency electric fields in the range of 60 Hz assist in the timely unwanted breakdown of liquid insulators. This problem, which has plagued the electric power industry for decades constitutes a phenomenon that has not been taken advantage of. Specifically, although the dielectric breakdown of liquids used as insulators with low frequency electric fields is known, to the best knowledge of the inventors of the present invention, high frequency electric fields have not been used to assist chemical reactions in liquids as a result of this breakdown phenomenon.

It is an object of the present invention to provide an apparatus and method that uses high frequency electric fields to initiate and/or enhance a chemical reaction in liquid continuous media at dielectric breakdown or pre-breakdown conditions.

SUMMARY OF THE INVENTION

This invention relates to the enhancement of chemical reactions by applying a high frequency electric field to a liquid continuous medium in order to induce at least one of a dielectric breakdown and a dielectric pre-breakdown condition therein. The frequency and amplitude of the electric field are selected in accordance with the properties of the reacting components in the bulk of chemical reactor. In general, the high frequency range is determined by the dielectric properties of reactant(s), that is, at any given temperature, when, for example, the specific conductivity starts to grow from its low frequency value. Typically, frequencies in the range of 100 kHz to 200 GHz or greater are suitable for the enhancement of the reactions. An electric field of any shape having Fourier components that when applied to a chemical process exhibits growth in the real part of conductivity relative to the low frequency value is of particular importance.

In accordance with an embodiment of the instant invention there is provided an apparatus for enhancing a chemical reaction comprising:

(a) a chemical reactor for containing a liquid sample selected from the group including: a single component liquid; a multi-component liquid; and, a liquid continuous multi-phase system; and, (b) two or more electrodes of any shape for applying to the liquid continuous sample an electric field with a carrying frequency greater than 100 kHz and less than 200 GHz and no limitation on the modulation of the electric field;

wherein, in use, the amplitude of the electric field is sufficient to induce dielectric breakdown or pre-breakdown conditions within the liquid continuous sample, which are necessary conditions for the present invention.

In accordance with another embodiment of the instant invention there is provided a method of controlling a chemical reaction comprising the steps of:

a) providing to a chemical reactor a liquid continuous sample selected from the group including: a single component liquid; a multi-component liquid; and, a liquid continuous multi-phase system;

b) applying to the liquid continuous sample an electric field having a carrying frequency greater than 100 kHz and less than 200 GHz and no limitation on the modulation of the electric field, wherein the amplitude of the electric field is sufficient to cause at least one of a breakdown condition and a pre-breakdown condition within the liquid continuous sample;

c) detecting an indication of at least one of the breakdown condition and the pre-breakdown condition within the liquid continuous sample resulting from the applied electric field; and, d) controlling the chemical process in dependence upon a feedback signal related to the indication of at least one of the breakdown condition and the pre-breakdown condition.

In accordance with yet another embodiment of the instant invention there is provided a method of controlling a chemical process involving a liquid continuous sample that behaves substantially as a dielectric when subject to an electric field having a carrying frequency below 60 Hz and exhibits an increased electric conductivity when subject to an electric field having a carrying frequency above 100 kHz, the method comprising the steps of:

a) providing the liquid continuous sample to a reactor having a reaction chamber for accommodating the liquid continuous sample;

b) applying an electric field across a region of the reaction chamber for causing an increase in specific conductivity of the liquid continuous sample; and, c) detecting information related to the progress of the chemical process resulting from the increase in specific conductivity and at least one of a breakdown and pre-breakdown condition.

In accordance with yet another embodiment of the instant invention there is provided an apparatus for enhancing a chemical reaction comprising:

(a) a reactor having a reaction chamber for accommodating a liquid sample therein;

(b) a first and a second electrode for applying to the liquid sample an electric field having an alternating current with a carrying frequency and an amplitude sufficient to cause at least one of a breakdown condition and a pre-breakdown condition within the liquid sample; and, (c) an electrical controller for controlling the application of the electric field.

In accordance with yet another embodiment of the instant invention there is provided an apparatus for enhancing a chemical reaction comprising:

(a) a reactor having a reaction chamber for accommodating a liquid sample therein;

(b) a first and a second electrode for applying to the liquid sample an electric field having an alternating current with a carrying frequency and an amplitude sufficient to cause at least one of a breakdown condition and a pre-breakdown condition within the liquid sample;

(c) a sensor for detecting an indication of the at least one of the breakdown condition and the pre-breakdown condition and for providing a feedback control signal in dependence thereof; and, (d) an electrical controller for controlling the application of the electric field in dependence upon the feedback control signal.

In accordance with yet another embodiment of the instant invention there is provided a method of controlling a chemical reaction comprising the steps of:

a) providing a liquid sample to a reactor having a reaction chamber for accommodating the liquid sample therein;

b) applying to the liquid sample an electric field having a carrying frequency and an amplitude sufficient to cause at least one of a breakdown condition and a pre-breakdown condition within the liquid sample;

c) detecting an indication of at least one of the breakdown condition and the pre-breakdown condition within the liquid sample resulting from the applied electric field; and, d) controlling the chemical process in dependence upon a feedback signal related to the indication of at least one of the breakdown condition and the pre-breakdown condition.

BRIEF DESCRIPTION OF THE DRAWINGS

Exemplary embodiments of the invention will now be described in conjunction with the following drawings, in which similar reference numerals designate similar items.

DETAILED DESCRIPTION

It is well-known that passing an electrical field through a liquid dielectric medium usually causes chemical reactions. In most instances, these chemical reactions are undesirable due to the resulting change in dielectric properties of the medium. In general, the more conductive a dielectric material is, the easier it is to induce such chemical reactions by an applied electric field. This statement is based on the following generalized Ohm formula:

$$Q = \sigma'(\omega)E^2 \tag{1}$$

wherein Q is total energy density dissipation rate into the dielectric material, E is the magnitude of the electric field strength, and $\sigma'(\omega)$ is the specific conductivity of the medium which depends on frequency, $\omega$. The dissipated energy has two parts, one part contributes to chemical reactions and the other converts to heat, according to equation (2).

$$Q = Q_{chem} + Q_{therm}. \tag{2}$$

If no chemical reaction occurs, $Q_{chem}$ should be zero. If the reaction is exothermal, then there will be additional heat produced by the reactions, which implies $Q_{chem}$ is negative. For an endothermic reaction, heat will be absorbed, and hence $Q_{chem}$ is positive.

According to equation (1), the higher the electric conductivity the smaller the required electric field strength, for a desired total energy dissipation rate.

In general, the conductivity depends also on the local temperature and electric field strength, normally increasing with temperature and field strength. Under the critical condition, non-uniformity in field strength or thermal fluctuations in the dielectric medium causes increases in local conductivity. This leads to a further increase in temperature, which in turn further increases the local conductivity. This unstable cycle leads to the local dielectric breakdown.

If the regions of local dielectric breakdown are not concentrated enough, i.e., so that the heat dissipates into the medium where local dielectric breakdown is not present, "die out" of the local dielectric breakdown results. This phenomenon is called pre-breakdown, or silent discharge state. If the density of the local dielectric breakdown sites is high, then it can lead to a continuous dielectric breakdown process.

In summary, there are three regimes when a dielectric medium is within an electric field: (1) dielectric heating; (2) pre-breakdown state; and (3) dielectric breakdown process.

In breakdown conditions, we expect maximum chemical reactions, inasmuch as local energy concentration is enough to break chemical bonds of molecules comprising the sample.

In the prior art, breakdown conditions have typically been achieved by applying a very high voltage across a gap between two electrodes. In general, the high voltage is necessary due to the very low conductivity of dielectrics when a DC or lower frequency electric field is applied. However, at higher frequencies a much lower voltage is required to induce dielectric breakdown, because of the higher conductivity properties of the dielectrics therein. For example, tests with 5W30 motor oil show breakdown at 160 kV/cm under DC or very low frequency conditions, while the same oil shows dielectric breakdown at 20 kV/cm at 27 MHz.

In the instant invention, the latter phenomenon is used to control chemical processes. Preferably, it is used to achieve or enhance chemical reactions in hydrocarbon media that are considered typical dielectrics.

More specifically, the instant invention relates to a method and system that uses high frequency electric fields of any shape at dielectric breakdown or pre-breakdown conditions for initiating and/or enhancing a chemical reaction. The selected high frequency or high frequency range is determined by the dielectric properties of the reactant medium, either the chemical components or phases, at a given temperature. For example, a frequency of the electric field can be determined by measuring the specific conductivity of the medium vs. frequency within a range when the conductivity increases from its low frequency value.

The dielectric breakdown chemical reactor (DBCR) of the instant invention is particularly useful for selectively increasing the reactivity of chemical compounds including crude oils, and for converting them to higher valued products, such as for instance by one of a hydrogenation and a cracking reaction. Other anticipated applications for the DBCR include: destruction of toxic liquids absent combustion thereof; partial upgrading and liquefaction of heavy oils and other petroleum products; and, operation as a reversed fuel cell for the chemical storage of renewable energy.

Figure 1:
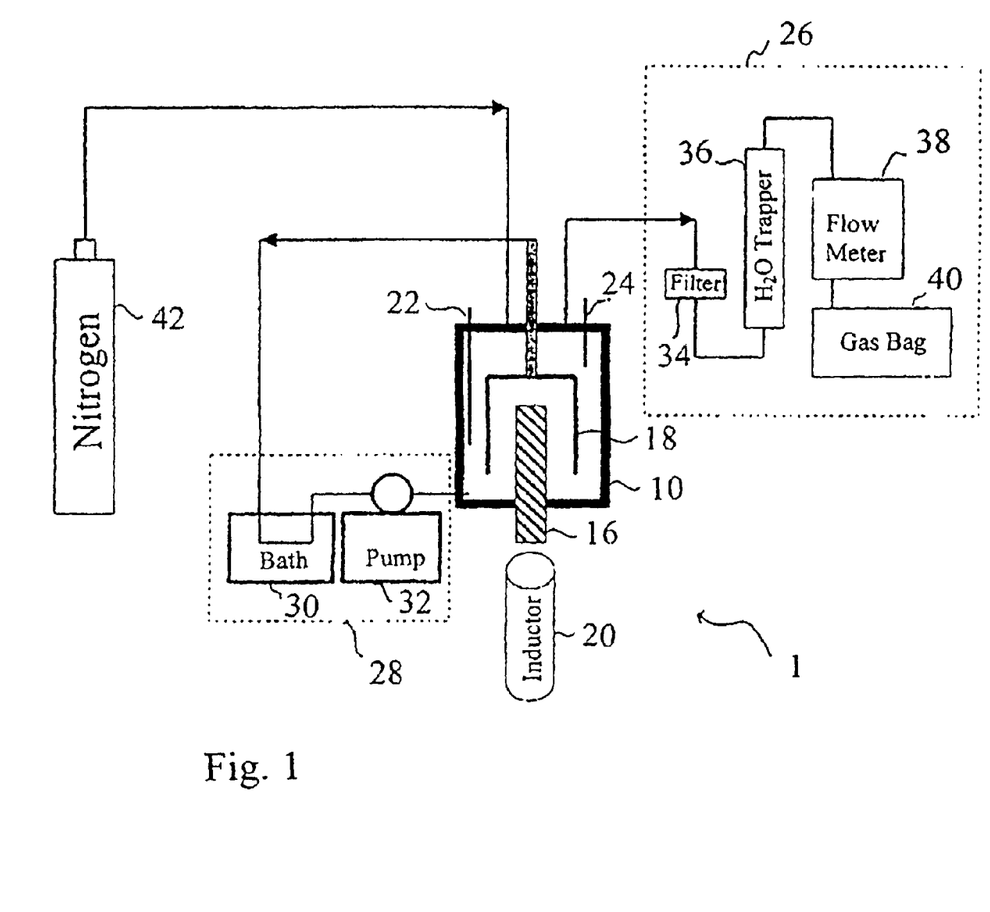
FIG. 1 shows a simplified block diagram of a system, including a reactor according to first embodiment of the instant invention.

Referring to FIG. 1, an embodiment of the instant invention is shown. A reactor 1 having a reaction chamber 10 for accommodating a liquid continuous sample therein is provided with means for applying a high frequency AC electric field to the liquid continuous sample. Preferably, the means for applying the high frequency electric field includes at least two electrodes, including a power electrode 16 and a ground electrode 18. An induction coil 20 transfers high frequency electric power to the power electrode, and serves as control means for controlling the application of the electric field.

Optionally, the reactor 1 is equipped with a temperature sensor 22 for measuring the average temperature in the reactor 10, an acoustic sensor 24 for detecting audible signals resulting from changes in the reacting medium, such as pre-breakdown conditions, means for providing a flow of gas to the reaction chamber 42, a produced gas collection system 26 for monitoring the rate of gas flowing through the reactor and comprising a filter 34, a water trap 36, a flow meter 38 and a gas bag 40, and/or a liquid circulation system 28, comprising a bath 30 and a pump 32. Further optionally, the reactor 1 includes means for affecting the temperature of the liquid continuous sample within the reaction chamber 10, such as for instance a resistive heating element. Of course, other means for affecting the temperature of the liquid continuous sample within the reaction chamber 10 are used optionally. Further optionally, the produced gas collection system 26 includes a separator for separating and/or collecting gaseous and/or solid reaction products.

An electronic feedback system (not shown) provides means for controlling the application of the electric field. Specifically, the electronic feedback system analyses data from at least one of the temperature sensor 22, the acoustic sensor 24, the gas collection system 26, and the applied voltage to determine automatically changes to the applied electric field. Alternatively, the electric field is modified manually.

Figure 2:
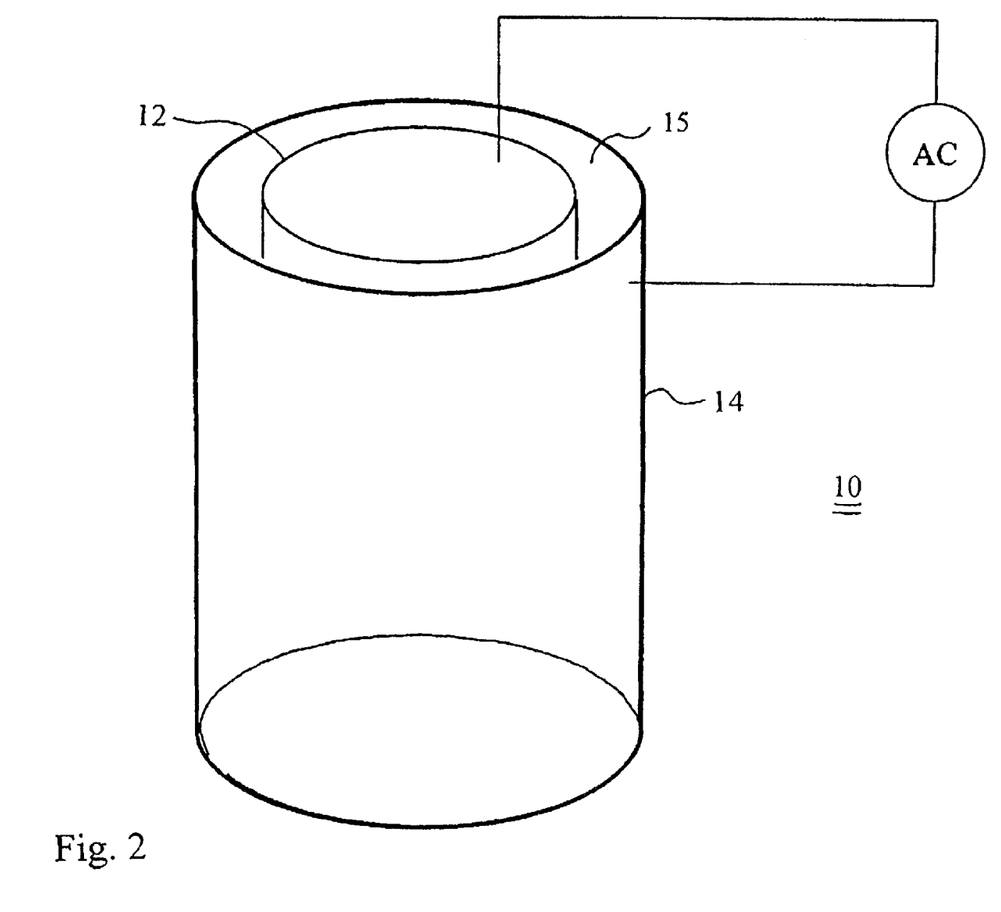
FIG. 2 shows a simplified view of a reactor according to a second embodiment of the instant invention.

In the embodiment shown in FIG. 2, the reaction chamber 10 is in the form of two coaxial cylinders that serve as the power and ground electrodes. The reaction chamber 10 includes an inner cylinder 12 and an outer cylinder 14 forming a cavity 15 therebetween for accommodating the sample. The inner cylinder has an outer wall for coupling to the inner wall of the outer cylinder via the sample.

Figure 3:
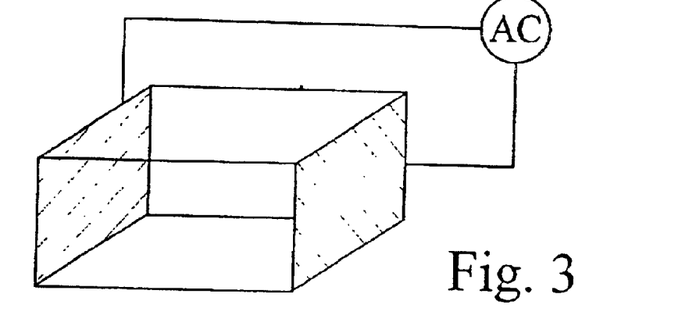
FIG. 3 shows a simplified view of a reactor according to a third embodiment of the instant invention.

In another embodiment, shown in FIG. 3, the power 16 and ground 18 electrodes are in the form of movable opposing walls of an approximately rectangular vessel. Of course other types of reaction chambers and/or means for applying a high frequency electric field are suitable. For example, electrodes of various shape(s) are moveable in various ways to modify the gap and/or volume of sample between the electrodes. The term movable, as used herein, encompasses both translational and rotational motions. At yet higher frequencies wave-guides or special antennas are suitable for introducing an electric field to the sample, which exists in a liquid continuous form.

In operation, the reactor is provided with a liquid continuous sample to be used in the chemical process. For example, the sample is a fluid or a liquid continuous colloidal system, such as a petroleum product, or water-in-oil emulsion. In general, most samples exhibit an increase in conductivity when they experience an applied high frequency electric field. The degree of increase is dependent upon the specific sample. The sample to be used in the reactor of the present invention must show a high response with respect to changes in conductivity, when a high frequency electric field is applied thereto. Preferably, the sample behaves as a dielectric at industrial frequencies of 50 or 60 Hertz, and exhibits increasing electric conductivity with increasing frequencies above 50 or 60 Hz.

The induction system 20, in combination with the power electrode 16 and the ground electrode 18, provides a high frequency AC electric field to the sample. The term 'frequency,' as used herein, encompasses a frequency or Fourier frequency component within a frequency range that is substantially about or higher than 100 kHz and less than 200 GHz. The amplitude and frequency range of the electric field is determined by the dielectric properties of the sample.

To determine the minimum values of the amplitude and frequency for either breakdown or pre-breakdown conditions, a relationship between the conductivity of the dielectric and applied frequency is determined, for example, as with an impedance analyzer. The frequency is selected where the conductivity of the sample is substantially higher than at analogous DC conditions. Preferably, the frequency is selected such that the frequency dependent conductance of the sample is at least two times higher than it is under analogous DC conditions.

Figure 4:
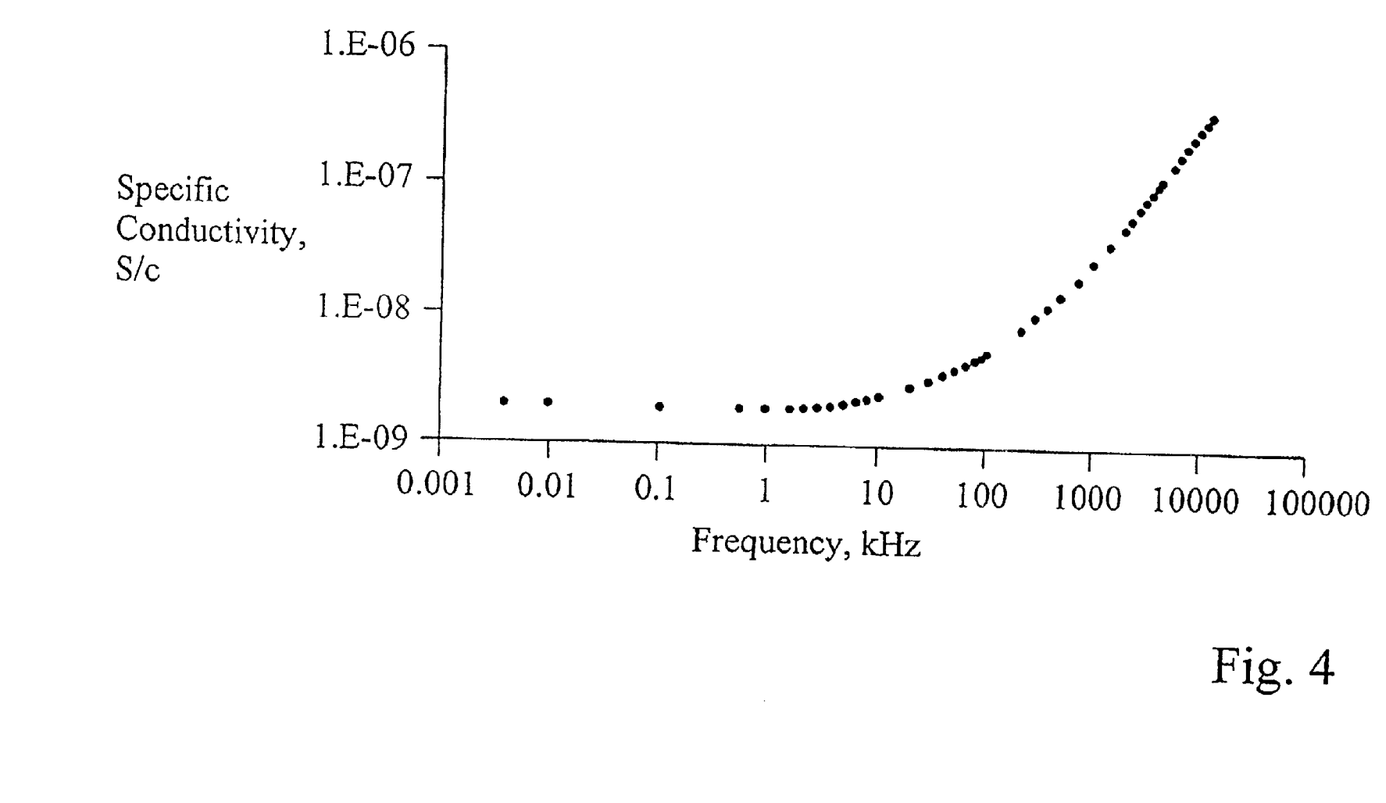
FIG. 4 shows a plot of the measured specific conductivity of 505 weight Athabasca bitumen in tetralin as a function of frequency under an applied electric field about 10 V/cm.

Referring to FIG. 4, a plot of the measured specific conductivity of 50% weight Athabasca Bitumen in tetralin as a function of frequency under an applied electric field of about 10 volt/cm is shown. This experimental result obtained at the Alberta Research Council laboratory demonstrates that at frequencies above 1 MHz the specific conductivity of the solution increases dramatically such that a lower amplitude/voltage is required to achieve breakdown.

In general, the amplitude and frequency are selected also in dependence upon the temperature within the reactor, since whatever affects conductivity will also affect the minimum value of field strength and frequency. Similarly, the addition of additives, such as organometallics or ionic compounds, positively affects the conductivity with or without increasing the frequency of the applied field.

Once the frequency range has been selected, an industrial radio frequency zone within this range is applied to the sample. The amplitude of the AC electric field is adjusted to induce pre-breakdown and/or breakdown conditions within the liquid continuous sample. Optionally, one of a DC electric field, a low frequency AC electric field, including industrial 50 or 60 Hz, and a magnetic field is applied to the sample during a same overlapping period of time of the application of the high frequency AC electric field.

The generated high frequency AC electric field penetrates the space between the electrodes and affects the sample therebetween. Preferably, the arrangement of the electrodes permits a significantly large portion of the sample to experience the applied high frequency AC electric field at about the same time. When the frequency and magnitude of the high frequency AC electric field are adjusted to be at a level corresponding to a dielectric breakdown or pre-breakdown condition of the sample, the conductivity of the dielectric medium increases substantially. The breakdown voltage, which is dependent upon the amount of energy that is reflected and/or absorbed by the sample, is measured. The reactor is preferably considered as part of an electromagnetic resonant circuit or chain. As such, tuning one of the frequency or another variable, such as electrode spacing to change a capacitance, is performed so that the entire system, including the reactor, absorbs maximum energy. Otherwise, at least a portion of the energy that is supplied to the reactor is other than absorbed, for instance reflected or transmitted, and the resulting energy efficiency of the system is low.

During pre-breakdown, the sample produces an audible but very low noise. The acoustic sensor 24 is provided to detect this noise. During breakdown conditions the reaction is monitored in dependence upon oscillations in the applied high frequency voltage, as described above. The acoustic sensor 24 distinguishes the process of pre-breakdown from the normal dielectric heating and from breakdown conditions.

The temperature sensor 22 measures the average temperature in the reactor. Note that the average temperature is distinguished from local temperatures, which fluctuate from place to place within the reactor. The flow meter 38 is provided for measuring the rate of gas flow through the cell when there is no gas produced by reactions, for example, when a constant flow of nitrogen into the reactor is desired, or for measuring an increase in gaseous output from the reactor, for indicating the production of a gas in the reaction chamber. The production of gases is common in pre-breakdown, or more often, in breakdown conditions. Optionally, other than an inert gas is flowed through the cell, such as for instance a gas for enhancing a chemical reaction occurring within the liquid continuous sample.

In fact, more chemical reactions typically occur under breakdown conditions than under pre-breakdown conditions. Tuning the frequency and amplitude of the high frequency AC electric field to maintain breakdown conditions allows optimum control and enhancement of the chemical reaction. The chemical process is controlled and/or enhanced by modifying at least one of a temperature and conductivity of the sample, and/or at least one of a shape, frequency, amplitude and duration of the applied electric field. For example, in varying the shape of the applied field, the amplitude of the signal is either constant or modulated, such as a pulsed signal. Of course, there is no limitation on the modulation of the electric field. As such, frequency modulation, amplitude modulation or no modulation of the high frequency electric field are contemplated for use according to the instant invention.

In one embodiment of the instant invention, the relative position and overlap of the electrodes is altered so as to change the electric field across the sample and/or to change the amount of sample between the electrodes.

In another embodiment of the instant invention, the electric field strength and power of the electric field during resonance, pre-breakdown, or dielectric breakdown of the sample, is adjusted or tuned to enhance a specific reaction that occurs during the interaction of the sample and the electric field.

In yet another embodiment of the instant invention, sequential reactions are enhanced by selecting a first frequency, amplitude, shape, and duration of the applied field for a first reaction and selecting at least one of a second frequency, amplitude, shape, and duration for a subsequent or a parallel reaction. Of course the number of reactions is dependent upon the chemical components of the sample. Further, a parallel reaction includes a reaction that begins at some time subsequent to the beginning of the first reaction, for instance a second reaction involving a product of the first reaction.

There are many advantages of the present invention over conventional electromagnetic applications-most are related to the fact that a high-frequency electric field is applied to the sample to induce pre-breakdown or breakdown conditions, which enhance the desired chemical process.

Another advantage of the instant invention relates to the fact that the electric field penetrates the entire contents of the reactants between the electrodes, thus enhancing the reaction throughout the reaction chamber.

Furthermore, since both the voltage and frequency are tunable, a high degree of control of the chemical reaction is achieved. For example, for a given sample, there exists a range of frequencies with which the chemical reaction is enhanced. The addition of other predetermined chemical compounds to the sample, such as the organometallic or ionic additives mentioned above, contributes to higher control of the chemical process. Optionally, such additives promote the dielectric breakdown and dielectric pre-breakdown conditions.

Since the pre-breakdown and/or breakdown phenomenon, which are necessary conditions for enhancing chemical reactions according to the instant invention, can be related to the resonant response of the sample to the high frequency electric field, the instant method is applicable to many different samples, and is not limited to requiring additives, which require further separation at the end of the chemical process. Typically, the frequency of the electric field is in resonance with the response frequency of at least part of the dielectric medium, either components or phases thereof.

To demonstrate the strength of the instant invention the following results, which were obtained in an experiment involving a sample of 5000 ppm of cobalt 2-ethylhexanoate mixed with tetralin, are provided by way of specific example. The sample was introduced into the reactor and subject to a constant flow of pure nitrogen at an inflow rate of 31 cc/min. Agreeably, the gas outflow rate as measured by the flowmeter was measured at 31 cc/min.

However, once the electric field was applied to the sample and pre-breakdown conditions were registered, the outflow gas rate jumped to as high as 50 cc/min. Increases in outflow gas rates occurred randomly during the entire pre-breakdown period. Furthermore, analysis of the outflow gas indicated the presence of hydrogen and oxygen, neither of which was present in the inflow gas.

Specifically the details of these results are summarized in the following three cases:
1) Energy input=30 KJ, no hydrogen found, oxygen=0.0737% Vol.;
2) Energy input=60 KJ, hydrogen=0.404% Vol., oxygen=1.98% Vol.,
3) Energy input=100 KJ, hydrogen=0.602% Vol., oxygen=2.4% Vol.
In each case, the frequency of the applied field was approximately about 27 MHz.

The observed ratio of hydrogen to oxygen is too high to be explained by a potential air leak or contamination. Typically, at 25° C. and atmospheric pressure, the volume of oxygen in air is 20%, while that of hydrogen in air is only 0.00062% Vol. Accordingly, the produced hydrogen is attributed to a chemical reaction enhanced by the pre-breakdown state.

The above data provides an example of hydrogen production from hydrocarbon mixtures. More profound results with higher yield were obtained at the dielectric breakdown conditions. The results include cracking of hydrocarbons and hydrogenation of petroleum products.

The instant invention provides an apparatus and method that is highly suited for use in the production of hydrogen, or hydrogen rich gases, which is a highly desirable and valuable process.

Of course, numerous other embodiments may be envisaged, without departing from the spirit and scope of the invention.

What we claim is:

1. A method of controlling a chemical reaction comprising the steps of:
    a) providing to a chemical reactor a liquid continuous sample selected from the group including: a single component liquid; a multi-component liquid; and, a liquid continuous multi-phase system;
    b) applying to the liquid continuous sample an electric field having a carrying frequency greater than 100 kHz and less than 200 GHz and no limitation on the modulation of the electric field, wherein the amplitude of the electric field is sufficient to cause at least one of a dielectric breakdown condition and a dielectric pre-breakdown condition within the liquid continuous sample;
    c) detecting an indication of at least one of the dielectric breakdown condition and the dielectric pre-breakdown condition within the liquid continuous sample resulting from the applied electric field; and,
    d) controlling the chemical reaction in dependence upon a feedback signal related to the indication of at least one of the dielectric breakdown condition and the dielectric pre-breakdown condition.

2. A method as defined in claim 1 wherein the frequency of the electric field is selected to be in resonance with a response frequency of at least one of a component and a phase of the liquid continuous sample.

3. A method as defined in claim 1 including the step of applying to the liquid continuous sample a second carrying frequency, the second carrying frequency in resonance with a response frequency of at least one of a second component and a second phase of the liquid continuous sample.

4. A method as defined in claim 1 including the step of applying to the liquid continuous sample an additional low frequency electric field within the industrial range of 50 Hz to 60 Hz.

5. A method as defined in claim 1 including the step of applying to the liquid continuous sample an additional DC electric field.

6. A method as defined in claim 1 including the step of applying to the liquid continuous sample an additional magnetic field.

7. A method as defined in claim 1 including the step of adding a chemical compound to the liquid continuous sample for enhancement of the chemical reaction.

8. A method as defined in claim 1 including the step of providing a flow of a gas through the liquid continuous sample, the gas being provided from a source external to the chemical reactor.

9. A method as defined in claim 1 including the step of affecting the temperature of the liquid continuous sample.

10. A method as defined in claim 1 including the step of separating at least one of a gaseous reaction product and a solid reaction product from the liquid continuous sample.

11. A method as defined in claim 1 wherein the liquid continuous sample is a toxic liquid for destruction within the chemical reactor absent combustion.

12. A method as defined in claim 1 wherein the liquid continuous sample is a petroleum product for upgrading within the chemical reactor.

13. A method as defined in claim 1 wherein the liquid continuous sample is a precursor for the production of chemical compounds for the chemical storage of renewable energy.

14. A method of controlling a chemical reaction comprising the steps of:
    a) providing a liquid sample to a reactor having a reaction chamber for accommodating the liquid sample therein;
    b) applying to the liquid sample an electric field having a carrying frequency and an amplitude sufficient to cause at least one of a dielectric breakdown condition and a dielectric pre-breakdown condition within the liquid sample;

c) detecting an indication of at least one of the dielectric breakdown condition and the dielectric pre-breakdown condition within the liquid sample resulting from the applied electric field; and, d) controlling the chemical reaction in dependence upon a feedback signal related to the indication of at least one of the dielectric breakdown condition and the dielectric pre-breakdown condition.

15. A method as defined in claim 14 wherein the carrying frequency is higher than 100 kHz.

16. A method as defined in claim 15 wherein the carrying frequency is selected from a range of frequencies between 100 kHz and 200 GHz.

17. A method as defined in claim 16 wherein the carrying frequency of the electric field is selected in dependence upon the dielectric properties of the liquid sample.

18. A method as defined in claim 17 wherein a second other carrying frequency of the electric field is selected in dependence upon the dielectric properties of the liquid sample to control a second other chemical reaction.

19. A method as defined in claim 17 wherein the step of applying the electric field includes the step of adjusting at least one of a shape, duration, carrying frequency and amplitude of the electric field for inducing a dielectric pre-breakdown condition within the liquid sample.

20. A method as defined in claim 17 wherein the step of applying the electric field includes the step of adjusting at least one of a shape, duration, carrying frequency and amplitude of the electric field for inducing a dielectric breakdown condition within the liquid sample.

21. A method as defined in claim 17 wherein the step of applying the electric field includes the step of adjusting at least one of a shape, duration, carrying frequency and amplitude of the electric field for providing resonant conditions under which a reaction rate of the chemical reaction is increased.

22. A method as defined in claim 21 comprising the step of providing an acoustic sensor for detecting an indication of the dielectric pre-breakdown condition.

23. A method as defined in claim 21 comprising the step of providing a temperature sensor for detecting a temperature within the reactor.

24. A method as defined in claim 23 comprising the step of increasing the temperature of the liquid sample within the reactor.

25. A method as defined in claim 23 comprising the step of providing a gas flow meter for detecting at least one of the presence and amount of at least a gas within the reactor.

26. A method as defined in claim 25 comprising the step of providing a flow of a predetermined gas within the reaction chamber.

27. A method as defined in claim 14 wherein the liquid sample is one of a single component and a multi-component liquid sample.

28. A method as defined in claim 27 wherein the liquid sample is a liquid continuous multi-phase system.

29. A method as defined in claim 27 wherein the liquid sample is a petroleum product.

30. A method as defined in claim 27 wherein the liquid sample is selected from liquid samples that behave substantially as a dielectric when the electric field is below 60 Hz and exhibits an increased electric conductivity when the electric field is above 100 kHz.

31. A method as defined in claim 30 wherein the step of applying an electric field comprises the step of providing a first electrode and a second electrode.

* * * * *